(12) United States Patent
Dyba et al.

(10) Patent No.: US 9,582,289 B2
(45) Date of Patent: *Feb. 28, 2017

(54) COMMUNICATION INTERFACE SELECTION ON MULTI-HOMED DEVICES

(71) Applicant: Microsoft Technology Licensing, LLC, Redmond, WA (US)

(72) Inventors: Adam R. Dyba, Redmond, WA (US); Adam Sapek, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 883 days.

This patent is subject to a terminal disclaimer.

(21) Appl. No.: 13/850,284

(22) Filed: Mar. 25, 2013

(65) Prior Publication Data

US 2013/0254779 A1    Sep. 26, 2013

Related U.S. Application Data

(63) Continuation of application No. 12/333,331, filed on Dec. 12, 2008, now Pat. No. 8,407,721.

(51) Int. Cl.
*G06F 9/44* (2006.01)
*H04L 29/06* (2006.01)

(52) U.S. Cl.
CPC .............. *G06F 9/44* (2013.01); *H04L 69/14* (2013.01); *Y02B 60/33* (2013.01)

(58) Field of Classification Search
None
See application file for complete search history.

(56) References Cited

U.S. PATENT DOCUMENTS

| | | |
|---|---|---|
| 6,243,754 B1 | 6/2001 | Guerin et al. |
| 6,801,777 B2 | 10/2004 | Rusch |
| 6,993,584 B2 | 1/2006 | Border et al. |
| 7,330,486 B2 | 2/2008 | Ko et al. |
| 7,472,200 B1 | 12/2008 | Taylor et al. |
| 7,821,985 B2 | 10/2010 | Van Megen et al. |
| 7,843,843 B1 | 11/2010 | Papp, III et al. |

(Continued)

FOREIGN PATENT DOCUMENTS

WO    2006059369 A1    6/2006

OTHER PUBLICATIONS

Kashihara et al. "Path Selection Using Active Measurement in Multi-Homed Wireless Networks", 2004 IEEE, 4 pages.*

(Continued)

*Primary Examiner* — Van Nguyen
(74) *Attorney, Agent, or Firm* — John S. Jardine; Dan Choi; Micky Minhas

(57) ABSTRACT

Configurable selection of communication interfaces on a multi-homed computing device. Application programs executing on the computing device define preferences, policies, and/or restrictions for use of the various communication interfaces. Responsive to a request from one of the application programs to communicate with a destination computing device, a list of the communication interfaces is created based on the preferences defined by the application program. The application program iteratively attempts to establish a connection to the destination computing device using each of the communication interfaces on the list.

20 Claims, 11 Drawing Sheets

(56) References Cited

U.S. PATENT DOCUMENTS

| | | | |
|---|---|---|---|
| 7,849,195 B2 * | 12/2010 | Jokela | H04L 29/06 709/200 |
| 7,970,931 B2 | 6/2011 | Ventakaramaiah et al. | |
| 7,974,714 B2 | 7/2011 | Hoffberg | |
| 7,979,577 B2 | 7/2011 | Taylor et al. | |
| 8,078,753 B2 | 12/2011 | Bachmann et al. | |
| 8,843,657 B2 * | 9/2014 | Thubert | H04L 29/12915 709/238 |
| 9,049,042 B2 * | 6/2015 | Tagg | H04L 12/2856 |
| 2003/0065816 A1 | 4/2003 | Dharmadhikari et al. | |
| 2003/0204635 A1 | 10/2003 | Ko et al. | |
| 2006/0274750 A1 | 12/2006 | Babbar et al. | |
| 2007/0030855 A1 | 2/2007 | Ribiere et al. | |
| 2007/0061482 A1 | 3/2007 | Higuchi | |
| 2007/0211690 A1 | 9/2007 | van Megen et al. | |
| 2008/0049649 A1 | 2/2008 | Kozisek et al. | |
| 2008/0080413 A1 | 4/2008 | Cole et al. | |
| 2008/0080419 A1 | 4/2008 | Cole | |
| 2008/0080457 A1 | 4/2008 | Cole | |
| 2008/0080458 A1 | 4/2008 | Cole | |
| 2008/0165683 A1 | 7/2008 | Saha et al. | |
| 2008/0192681 A1 | 8/2008 | Lee et al. | |

OTHER PUBLICATIONS

Karsten et al. "Generalizing RSVP's Traffic and Policy Control Interface", 2000 IEEE, pp. 249-254.*

Lee et al. "Dynamic interface selection using policy routing for multihoming in mobile router with dual interfaces", 2008 IEEE, 5 pages.*

Venkitaraman, et al., "Session Aware Network Controlled Interface Selection for Multi-homed hosts", Retrieved at <<http://ieeexplore.ieee.org/stamp/stamp.jsp?arnumber=01311386>>, WCNC 2004, 2004 IEEE, pp. 1963-1968.

Ylitalo, et al., "Dynamic Network Interface Selection in Multihomed Mobile Hosts", Retrieved at <<http://www2.computer.org/plugins/dl/pdf/proceedings/hicss/2003/1874/09/187490315.pdf?template=1&loginState=1&userData=anonymous-IP1223872738208>>, 2002 IEEE, Proceedings of the 36th Hawaii International Conference on System Sciences (HICSS'03), pp. 10.

Sun, et al., "Towards Connectivity Management Adaptability: Context Awareness in Policy Representation and Endto-end Evaluation Algorithm", Retrieved at <<http://www.mediateam.oulu.fi/publications/pdf/615.pdf>>, MUM 2004, Oct. 27-29, 2004 College Park, Maryland, USA, 2004 ACM, pp. 8.

* cited by examiner

COMMUNICATION INTERFACE SELECTION ON MULTI-HOMED DEVICES

CROSS-REFERENCE TO RELATED APPLICATION

This application is a continuation of commonly-owned U.S. Pat. No. 8,407,721, filed Dec. 12, 2008, the entire disclosure of which is hereby incorporated by reference herein for all purposes.

BACKGROUND

Multi-homed hosts have a plurality of available communication interfaces. Applications executing on the host use one of the available communication interfaces for communication with other devices. When more than one of the communication interfaces are connected to a private network with a gateway and destination network address that are not explicitly matched, selection of the appropriate communication interface is difficult.

Some existing systems rely on a routing table. However, for any two interfaces of the same type (e.g., equal metric), the routing table treats multiple default-route entries the same with the assumption that any host is reachable over any of the two interfaces. In many cases (e.g., multiple access point names to restricted service networks), this assumption is wrong and the routing table fails. Additionally, the routing table fails to account for the possible existence of a firewall, a current state of each of the communication interfaces, a current state of the network, and other factors.

SUMMARY

Embodiments of the invention enable selection of communication interfaces based on policies and preferences defined by application programs. A request for communication from one of the application programs is received. The preferences associated with that application program are accessed. Based on the preferences, one or more of the communication interfaces are selected and provided to the application program.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
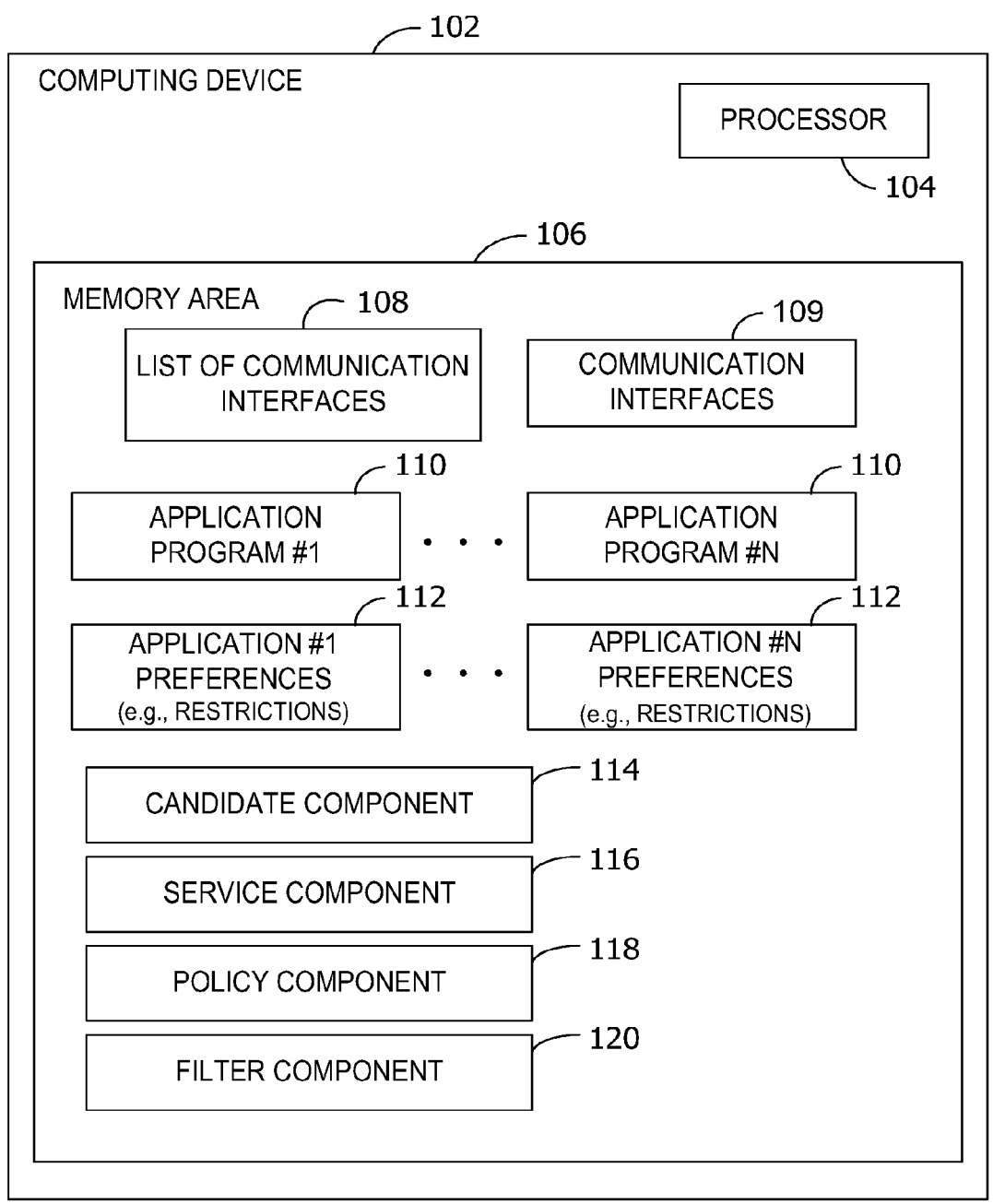
FIG. 1 is an exemplary block diagram illustrating a computing device executing applications communicating on communication interfaces.

Referring to the figures, embodiments of the disclosure provide configurable communication interface 109 selection on multi-homed computing devices 102. One of a plurality of application programs 110, such as application program #1 through application program #N, executing on one of the multi-homed computing devices 102 requests communication with another computing device such as a destination computing device. Embodiments of the invention select one or more of the communication interfaces 109 on the multi-homed computing device 102 and identify the selected communication interfaces 109 to the application program 110. The application program 110 attempts to communicate (e.g., establish a connection) with the destination computing device by iterating through the identified computing interfaces. In some embodiments, the communication interfaces 109 are Internet Protocol (IP) interfaces and the configurable selection occurs based on at least one of a plurality of factors such as preferences 112, policies, restrictions (e.g., security restrictions), or requirements of the application program 110, and a history or log of previous communication or connection attempts. The preferences 112, policies, restrictions, requirements, or log may be received from the application program 110.

Referring again to FIG. 1, an exemplary block diagram illustrates the computing device 102 executing the application programs 110 attempting to communicate via the communication interfaces 109. A memory area 106 associated with the computing device 102 stores a list 108 of the available communication interfaces 109 for the computing device 102. The memory area 106 further stores one or more application preferences 112, such as application preference #1 through application preference #N, for the communication interfaces 109. The preferences 112 include any measure of influence each application program 110 has over the selection of the communication interfaces 109. In some embodiments, the preferences 112 for each of the application programs 110 define a relationship between the communication interfaces 109 and one or more destination computing devices for the application program 110. Exemplary preferences 112 include one or more policies or restrictions. In some embodiments, the destination computing device represents a host, and the preferences 112 include an application-host pair for each of the communication interfaces 109. The preferences 112 may also be defined based on characteristics of the communication interfaces 109, or based on a connection attempt status logged from one or more previous attempts to communicate with specific communication interfaces 109. Exemplary characteristics of the communication interfaces 109 include power consumption and cost (e.g., billing characteristics of each of the interfaces).

In the example of FIG. 1, the memory area 106 is within or otherwise accessible to the computing device 102. However, the memory area 106 or any of the data stored thereon may be associated with a server or other computer such that the data is available on any computing device (e.g., laptop, desktop, telephone, etc.).

The computing device 102 has a processor 104 associated therewith. The processor 104 is programmed to execute computer-executable instructions for implementing aspects of the disclosure. In some embodiments, the processor 104 is programmed to execute instructions such as those illustrated in the figures (e.g., FIGS. 2-5).

The memory area 106 or other computer-readable media further stores computer-executable components including a candidate component 114, a service component 116, a policy component 118, and a filter component 120. These components are described below with reference to FIG. 4.

Figure 2:
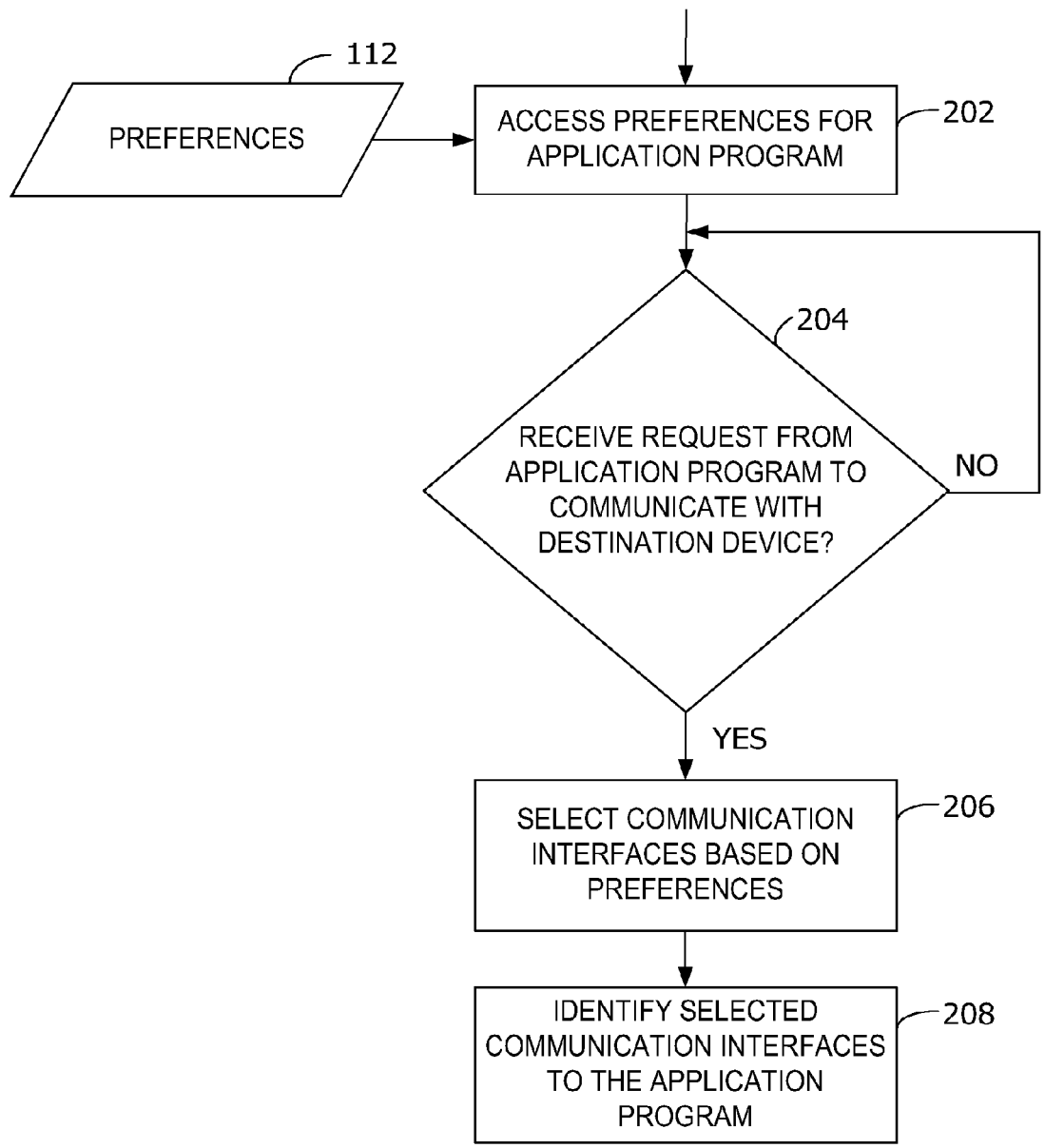
FIG. 2 is an exemplary flow chart illustrating the selection of communication interfaces based on application-specific preferences.

Referring next to FIG. 2, an exemplary flow chart illustrates the selection of communication interfaces 109 based on application-specific preferences 112. At 202, preferences 112 for one of the application programs 110 are accessed. For example, the preferences 112 for each of the application programs 110 may be loaded into internal working memory from a hard disk. If a request to communicate with a destination computing device is received at 204 from one of the application programs 110, embodiments of the disclosure select one or more of the communication interfaces 109 at 206 based on the accessed preferences 112 for the requesting application program 110. In some embodiments, the accessed preferences 112 are particular to the destination computing device. That is, the application programs 110 may have different preferences 112 for different destination computing devices. The selected communication interfaces 109 are identified at 208 to the requesting application program 110.

The requesting application program 110 (e.g., or a networking stack) iteratively attempts to communicate with the destination computing devices using the identified communication interfaces 109. For example, the requesting application program 110 attempts to establish a connection using each of the identified communication interfaces 109 in a defined order. The order may be defined by embodiments of the invention during the selection at 208. Alternatively or in addition, a default ordering may be applied to each selection of the communication interfaces 109. The selected communication interfaces 109 may be identified at 208 to the requesting application program 110 in total, or one at a time as the requesting application program 110 fails to establish a connection using each of the communication interfaces 109.

Figure 3:
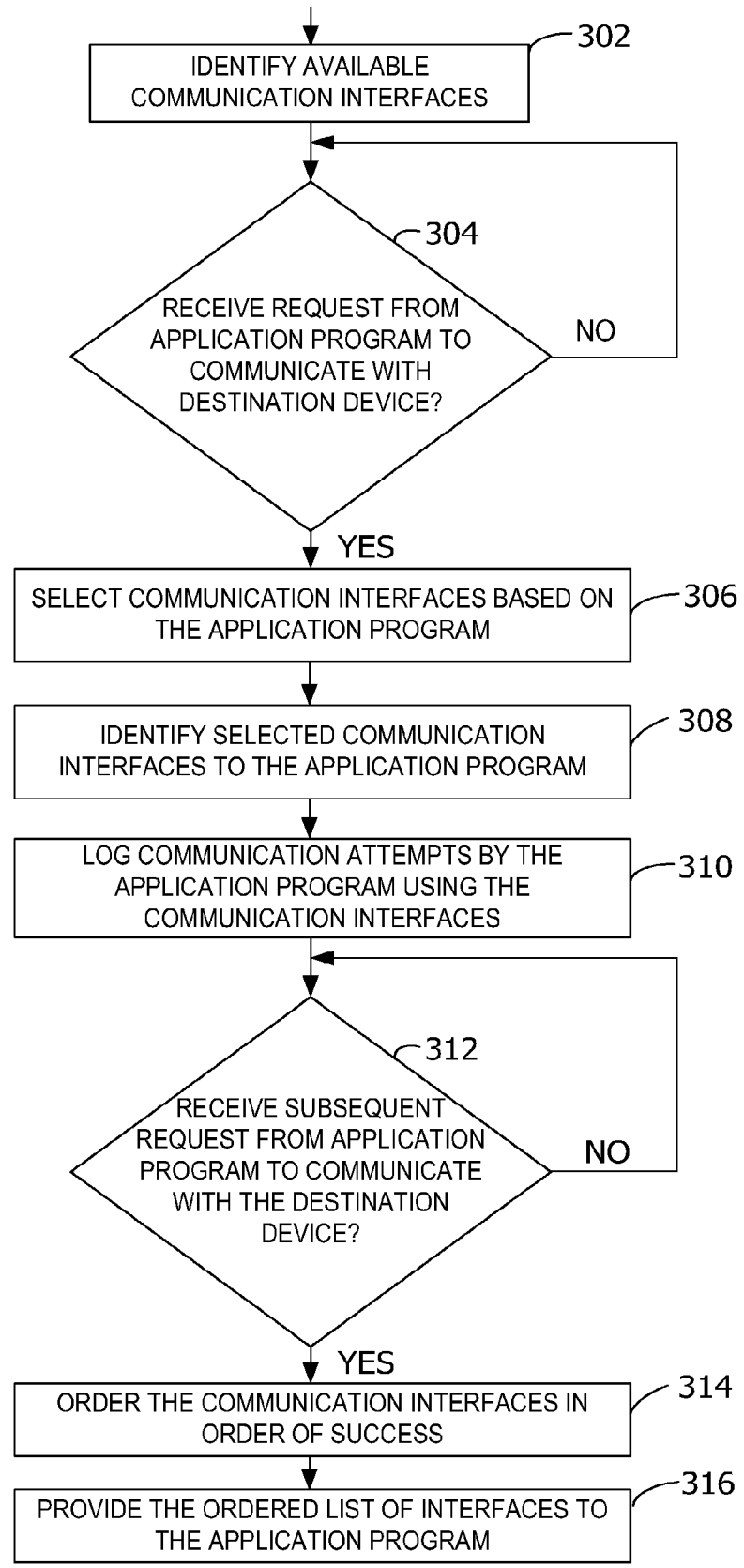
FIG. 3 is an exemplary flow chart illustrating the selection of communication interfaces based on previous communication attempts.

Referring next to FIG. 3, an exemplary flow chart illustrates the selection of the communication interfaces 109 based on previous communication attempts. At 302, a plurality of the communication interfaces 109 available on the computing device 102 is identified. If a request (e.g., a first request) to communicate with a destination computing device is received at 304, one or more of the identified communication devices are selected at 306 based at least on the requesting application program 110. The selected communication interfaces 109 are identified at 308 to the requesting application program 110. The application program 110 iteratively attempts to communicate with the destination computing device using the selected communication interfaces 109. For example, the application program 110 terminates the iteration when a successful connection has been made. A record of each communication attempt by the application program 110 to communicate with the destination computing device is stored or logged at 310. The record indicates a connection attempt status for each of the selected communication interfaces 109. The communication attempts may be logged by the application program 110, or the application program 110 may provide information about the communication attempt to a logging component.

If a subsequent request (e.g., a second request) to communicate with the destination computing device (e.g., the same destination computing device from the first request, or another computing device) is received at 312, the available communication interfaces 109 are selected and/or ordered at 314 based on a probability of success determined from the logged communication attempts. The ordered communication interfaces 109 are identified to the requesting application program 110 at 316. The requesting application program 110 iteratively attempts to communicate with the destination computing device using the ordered communication interfaces 109.

In some embodiments, the ordering at 314 includes the removal of communication interfaces 109 that have failed a defined quantity of previous communication attempts. In such embodiments, a threshold value is defined. The quantity of stored connection attempts or communication attempts for each of the communication interfaces 109 is compared to the corresponding defined threshold for the communication interface. The communication interfaces 109 are removed from the list 108 based on the comparison. Also referred to as "negative caching," such embodiments include a timeout when the negative cache entry is invalidated and the communication interface 109 (e.g., connection) is allowed to be tried again. Such embodiments provide a power/battery life optimization. For example, if a connection is configured incorrectly, the computing device 102 avoids trying to use the connection for every request from the applications 110.

In other embodiments, each of the communication interfaces 109 is tested prior to providing the ordered list 108 of communication interfaces 109 to the requesting application program 110 at 316. The communication interfaces 109 failing the test are unselected or removed from the list 108.

Figure 4:
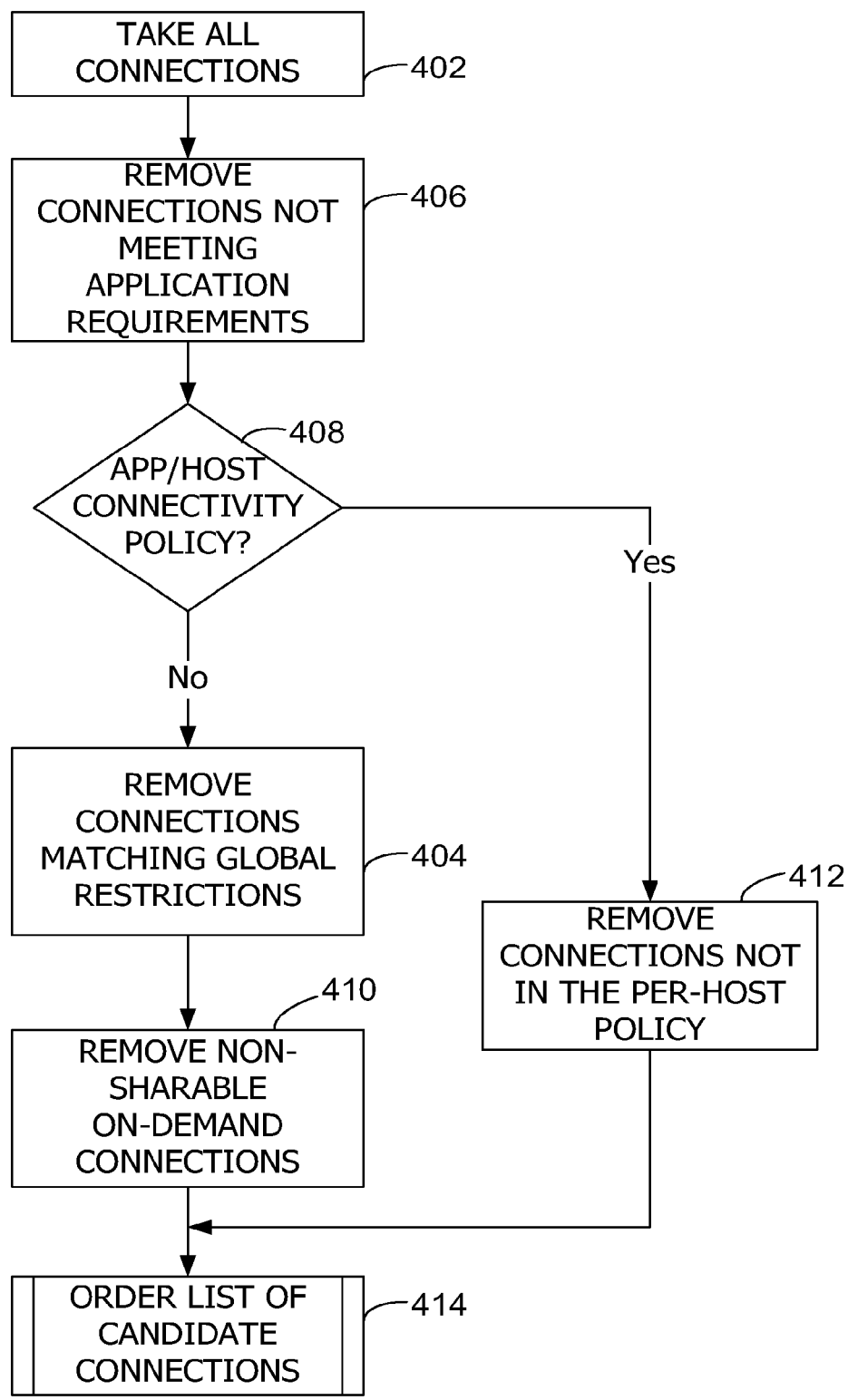
FIG. 4 is an exemplary flow chart illustrating the selection of communication interfaces based on application-specific policy.
Figure 5:
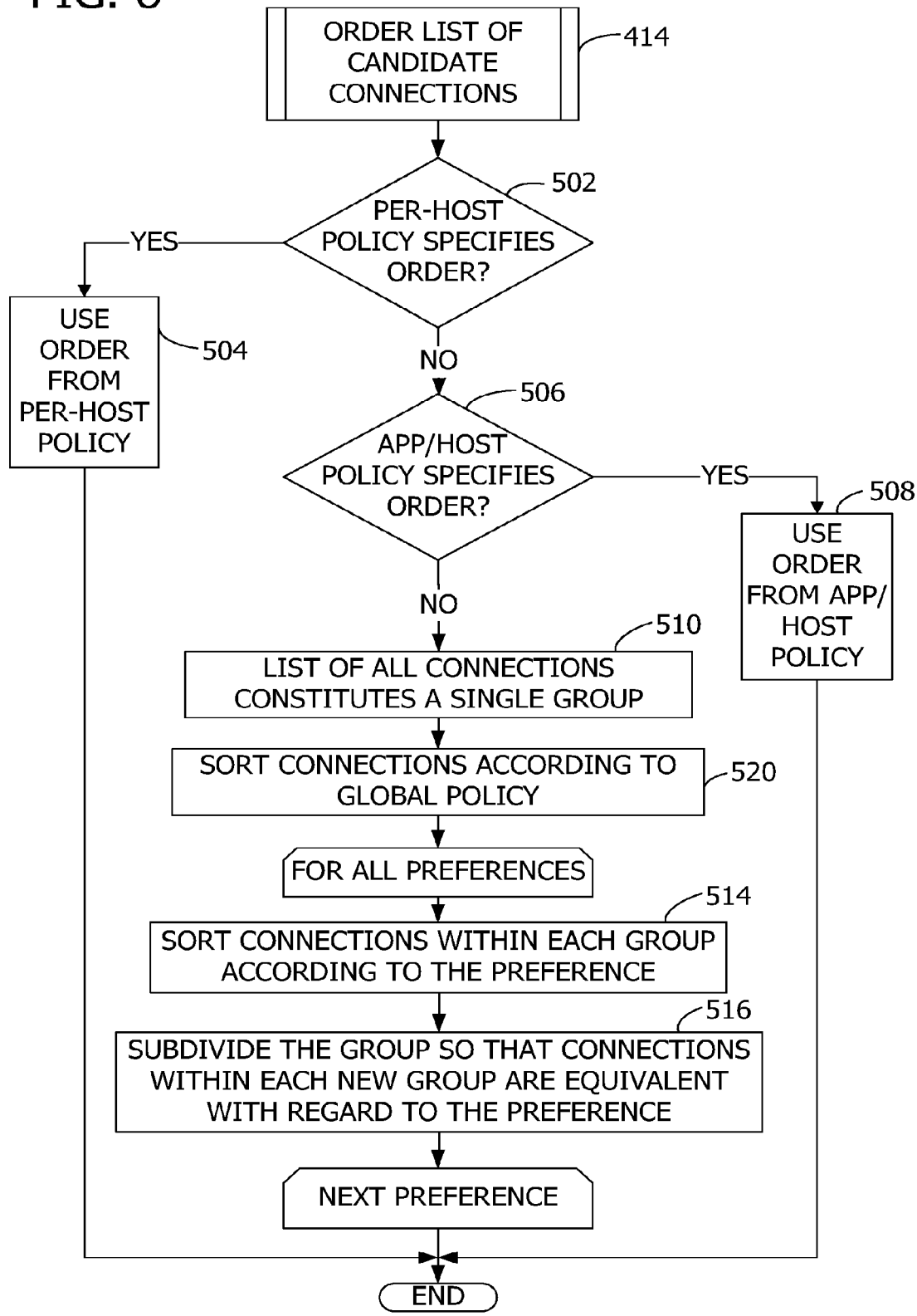
FIG. 5 is an exemplary flow chart illustrating the ordering of candidate communication interfaces.

Referring next to FIG. 4 and FIG. 5, the list 108 of communication interfaces 109 may be conceptually divided into two phases: selecting the candidate connections and determining the order of the candidate connections. In general, candidate connections may be selected as follows, as described below with reference to FIG. 4:

1. Start with all connections.
2. Remove any connection that does not meet one or more of connection requirements specified by the application.
3. Find intersection of the list from operation 2 and application/host connectivity if specified.
4. In the absence of a matching application/host policy, remove any connection that matches any of the restrictions in the global policy.
5. If no connectivity policy is specified, further perform intersection with a list including all always-connected and currently connected sharable on-demand connections. In some embodiments, sharable on-demand connections are referred to as "on demand" (e.g., CMCB_ON_DEMAND as in a sample header file) and non-sharable on-demand connections are referred to as "per-policy" (e.g., CMCB_PER_POLICY as in a sample header file). On-demand connections are explicitly specified in the application/host policy.

A connection service may also use other criteria (e.g., routing table, state of connections, etc.) in the selection process. In general, the list of candidate connections is then ordered as described below with reference to FIG. 5:

1. If application/host connectivity policy specifies order, use this order and skip further processing.
2. In general, policies (e.g., application/host policies and global policies) are considered before application preferences 112 are considered. Application preferences 112 are considered lower priority then global policies, in some embodiments. As such, if no application connection preferences 112 are specified, sort the list according to global preference policy and other criteria (e.g., state of connections, etc.).
3. If application connection preferences are specified, sort the list accordingly. If some of the connections may be considered to satisfy application connection preference equally well, the connections can be reordered based on the same criteria as in step 2.

Referring again to FIG. 4, an exemplary flow chart illustrates the selection of communication interfaces 109 based on application-specific policy. All available connections are identified at 402. Connections not meeting application requirements are removed at 406. If there is an application/host connectivity policy at 408, the connections not in the per-host policy are removed at 412. If there is not an application/host connectivity policy at 408, the connections matching global restrictions are removed at 404 and the non-sharable on-demand connections (e.g., per-policy connections) are removed at 410. The remaining candidate connections are ordered at 414.

In the embodiment of FIG. 4, the available connections are first identified, and then removed or filtered in accordance with policies, requirements, and/or restrictions. Generally, the components illustrated in FIG. 1 perform similar functionality. The candidate component 114 defines a list 108 of communication interfaces 109 available on the multi-homed computing device 102. The service component 116 receives, from one of the application programs 110 executing on the multi-homed computing device 102, a request to communicate with a destination computing device. The policy component 118 accesses one or more interface restrictions defined by the application program 110 and associated with the application program 110. Each of the application programs 110 may have separate or different interface restrictions. The filter component 120 removes at least one of the communication interfaces 109 from the list 108 based on the accessed interface restrictions. In some embodiments, the filter component 120 removes one or more of the communication interfaces 109 from the list 108 based on a connection attempt status associated with the selected communication interfaces 109.

The service component 116 provides the list 108 of interfaces from the filter component 120 to the application program 110. The application program 110 then iteratively attempts to communicate with the destination computing device using the provided list 108 of communication interfaces 109.

The connection restrictions policy specifies which connections should not be used by the application programs 110. In some embodiments, the policy is expressed as a list of individual connections and/or connection types. Examples of connection types include: Wi-Fi connections, GPRS connections, VPN connections, all data connections, etc. For example, if the user is traveling outside of the operator service area and GPRS traffic incurs a high roaming charge, the user sets a global policy to restrict all applications from using GPRS connections. The global connection preference policy specifies the default preference order for selecting connections. For example, a device may provide a choice of the following global connection preference policies: best performance, best battery life, and a balance between battery life and performance.

The application/host connectivity policy specifies which connections a particular request should use. In some embodiments, the policy is expressed as a mapping from a 2-tuple specifying requesting application program 110 and destination host to a list of individual connections and/or connection types. Either application or host (but not both) can be a wildcard such as *, meaning that policy applies to all applications 110 or all hosts. The wildcard can be also used a part of host name. Examples of connection types include: Wi-Fi connections, GPRS connections, VPN connections, all data connections, etc.

The grammar used in specification of the host is next described, along with the order in matching application/host policies and global mapping policies. In some embodiments, mappings policies are evaluated, in order from most to least specific, when constructing candidate list of connections for an application 110. The following is a list of types of mappings and the order in which they are evaluated, from first to last:

1. Application-host mapping: Defines a non-wildcard application and a fully or at least partially defined host in the key, <application, host>. The keys referring to the same application are ordered based on the host, number of segments, and longest to shortest prefix. The following lists the order in which keys from this type of policy are arranged.
   a. host: Host specified by single concrete segment, e.g. intranet host.
   b. +: any single concrete segment, e.g. all intranet hosts.
   c. host.suffix: Concrete host and its complete domain name as suffix, e.g. Internet host.
   d. +.suffix: Any single host segment as prefix with the given concrete suffix.
   e. *.+.suffix: Allows two or more segments as prefix with the given concrete suffix
   f. *.suffix: Allows one or more segments as prefix with the given concrete suffix, e.g. Hosts specified by IP address are ordered from a complete IP address, where prefix is either not specified or is the length of the address, to network with longest to shortest prefix.
2. Host mapping: Defines a fully or at least partially defined host in key, <*, host>. Mappings are ordered according to host as described in 1.
3. Application mapping: Defines a non-wildcard application in key, <application, *>.
4. Global mapping: Defines a wildcard application and host in key, <*, *>.

The first mappings policy that matches is used. Policies do not compose with one another. The mappings policy is used as the first level of filtering of candidate connections. Connections that remain may be further filtered by application specified requirements. The connection order imposed by policy overrides the application specified preferences 112 in some embodiments.

The list of connections in a policy may specify the order of the connections. For example, the application program 110 requires access to a corporate network. A policy for the application is to use either enterprise wireless local area network (LAN) or dial virtual private network (VPN). Whenever the device has access to the wireless LAN network, the application program 110 automatically uses it. Otherwise, the connection service automatically tries to establish a VPN connection and make the application use the VPN virtual interface.

Referring next to FIG. 5, an exemplary flow chart illustrates the ordering of candidate communication interfaces 109. If a per-host policy specifies an order at 502, the candidate communication interfaces 109 are ordered at 504 based on the per-host policy. If the application/host policy specifies an order at 506, the candidate communication interfaces 109 are ordered at 508 based on the application/host policy. If the application/host policy does not specify an order at 506, the list of available connections is defined as a single group at 510. The connections are sorted according to global policy at 520. For the preferences, connections with each group are sorted according to the preferences at 514. At 516, the groups are subdivided so that connections within each of the subdivided groups are equivalent with regard to the preferences. For example, if more than one preference 112 is specified, a connection service such as connection service 606 in FIG. 6 orders candidate connections based on the first listed preference 112 in some embodiments. The connections that are equivalent with regard to the first preference 112 are ordered based on the second preference 112, and so on. Connections are considered equivalent if the values of the preferred characteristic are within a small margin. If one of the preferences 112 includes a boundary value (e.g., Latency AT_MOST 100 ms), all connections for which the characteristic is beyond the value are considered equivalent.

Figure 6:
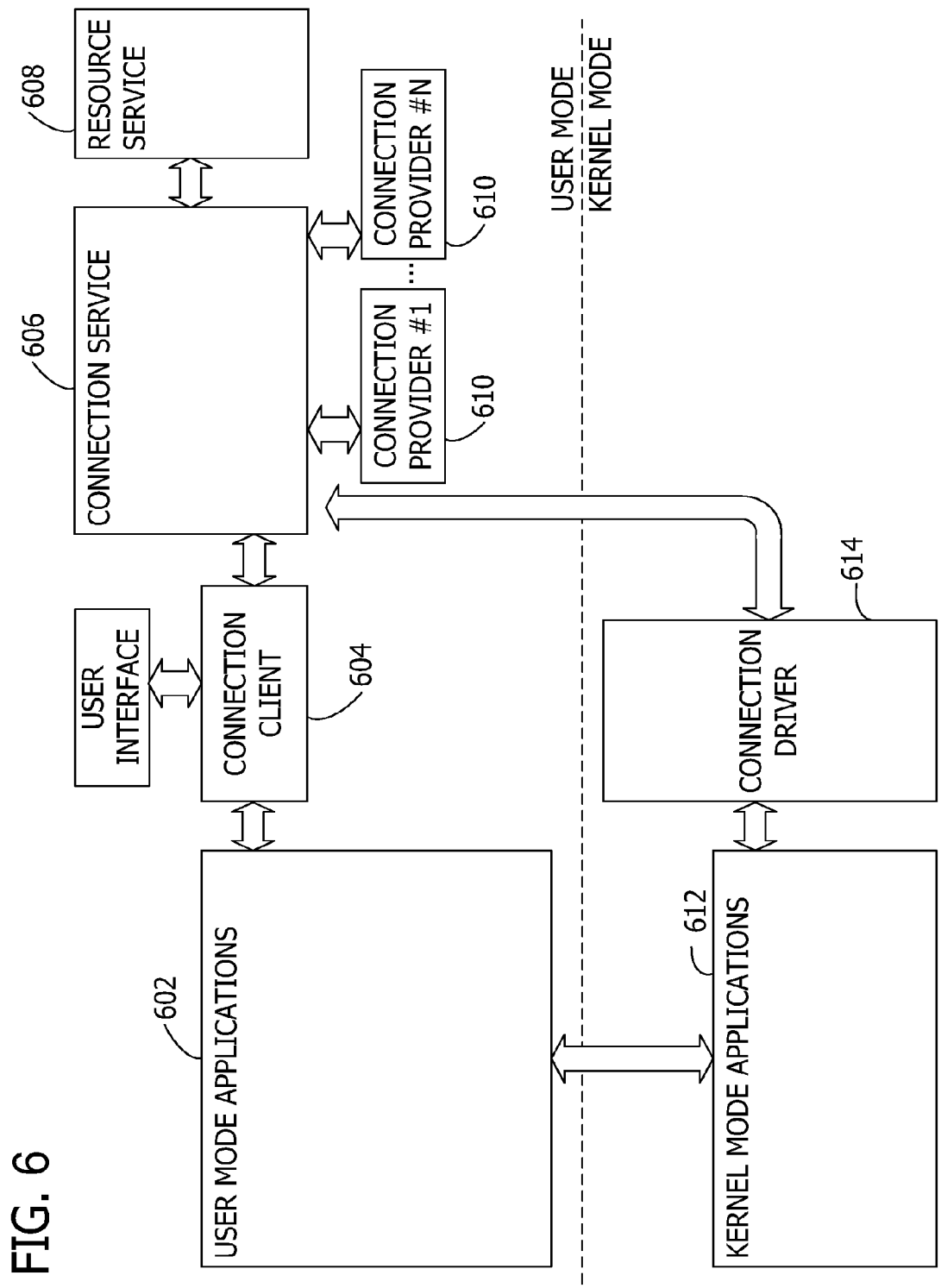
FIG. 6 is an exemplary block diagram illustrating user mode and kernel mode applications using a connection service.

Referring next to FIG. 6, an exemplary block diagram illustrates user mode and kernel mode applications using the connection service 606. The connection service 606 maintains a master list of connections, connection states, policies, lists of active application requests, etc. The connection service 606 interacts with the resource service to obtain resources, resolve resource conflicts, and be notified about conflicts originating from other system components using the same resources. The resource service 608 maintains a system-wide policy for resource conflict resolutions.

The example of FIG. 6 represents an exemplary architecture for implementing embodiments of the disclosure. The user mode applications 602 interface with a connection client 604 of the connection service 606. The connection service 606 works with a plurality of connection providers 610 such as connection provider #1 through connection provider #N. In some embodiments, the connection service 606 exchanges data with the resource service 608. For the kernel mode applications 612, a connection driver 614 interfaces between the kernel mode applications 612 and the connection service 606.

Figure 7:
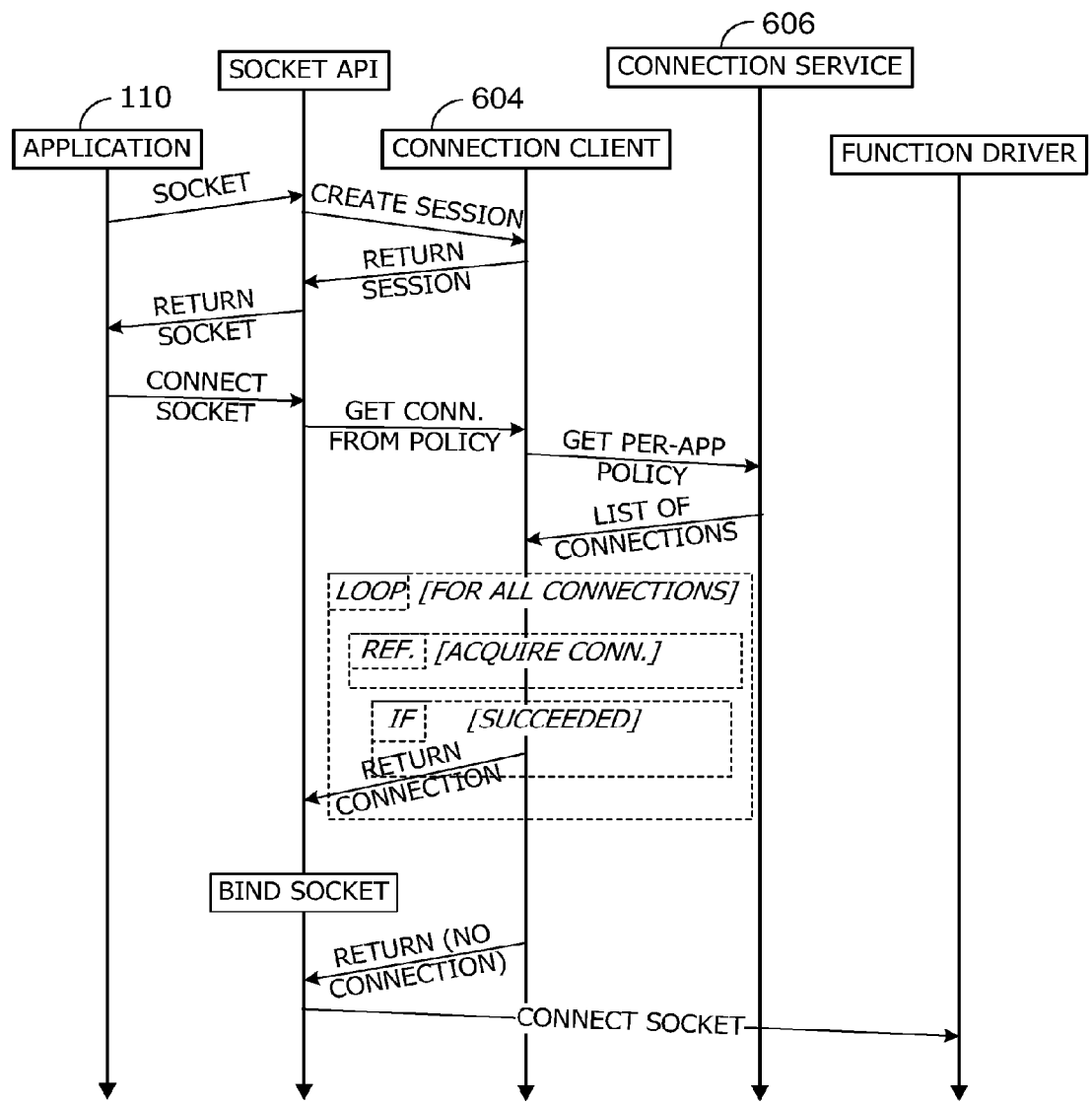
FIG. 7 is an exemplary sequence diagram illustrating an application obtaining a list of available communication interfaces from a connection service based on a policy.
Figure 8:
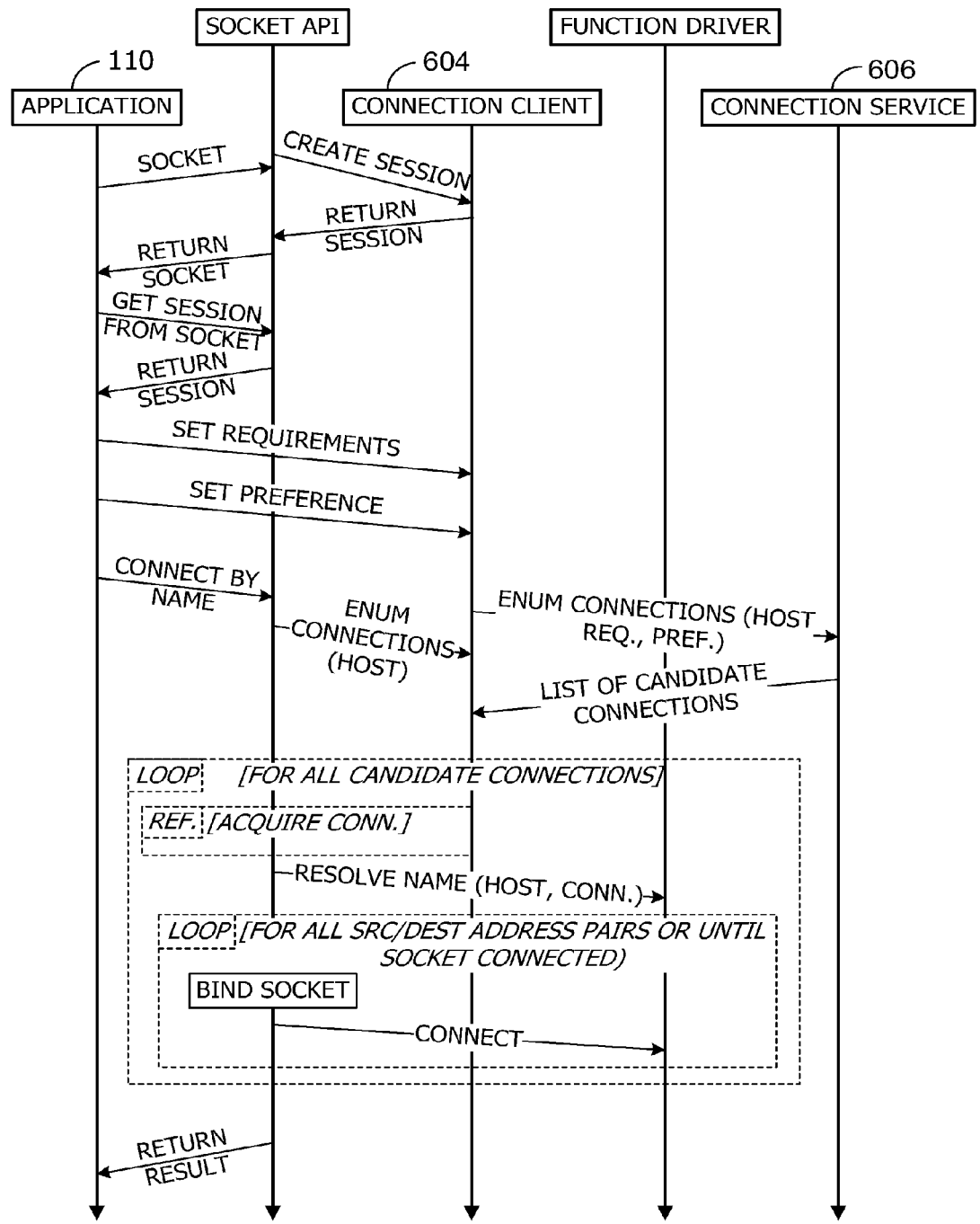
FIG. 8 is an exemplary sequence diagram illustrating an application enumerating a list of available communication interfaces.
Figure 9:
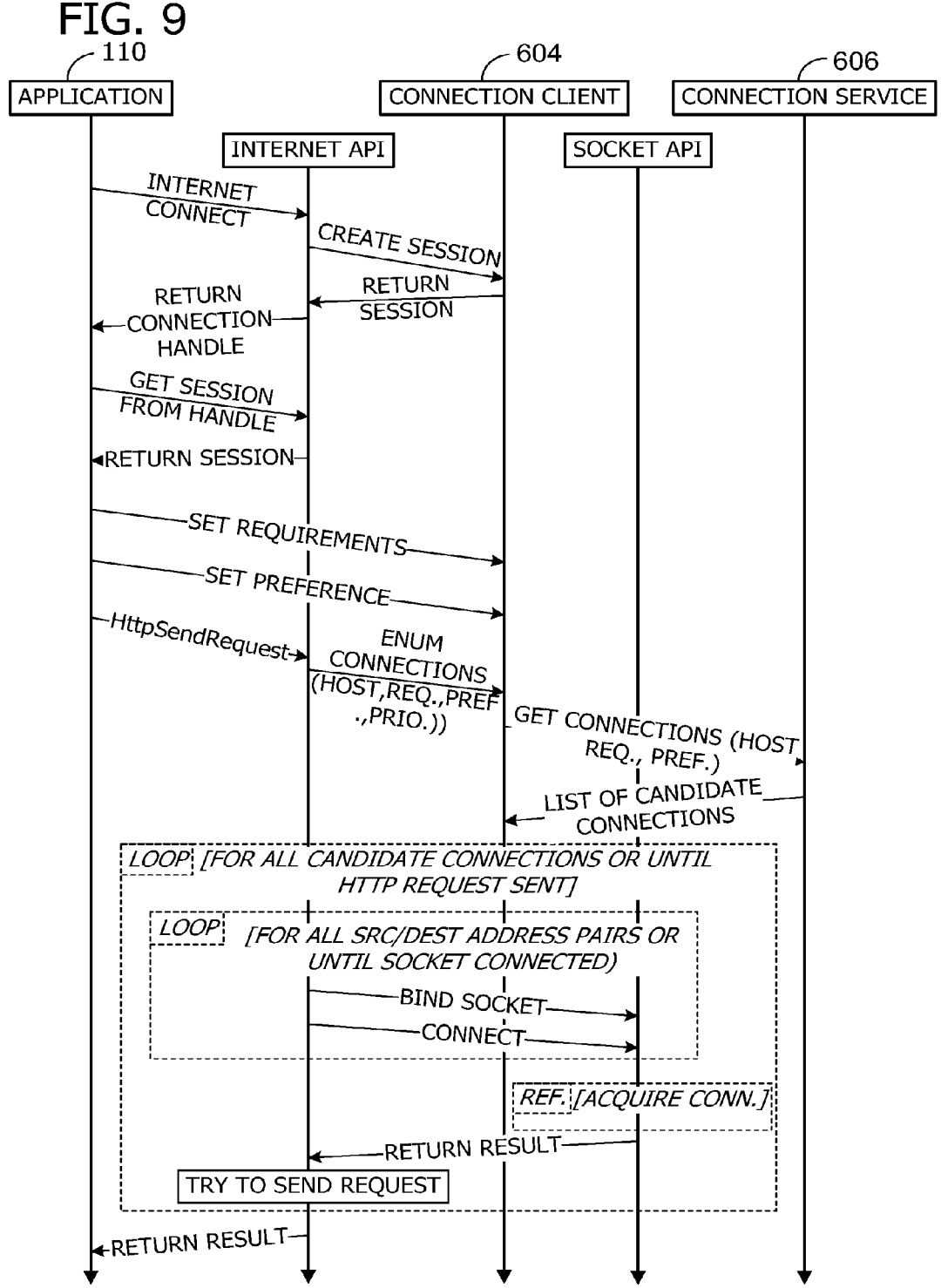
FIG. 9 is an exemplary sequence diagram illustrating an application selecting a communication interface over which to send a hypertext transfer protocol request.
Figure 10:
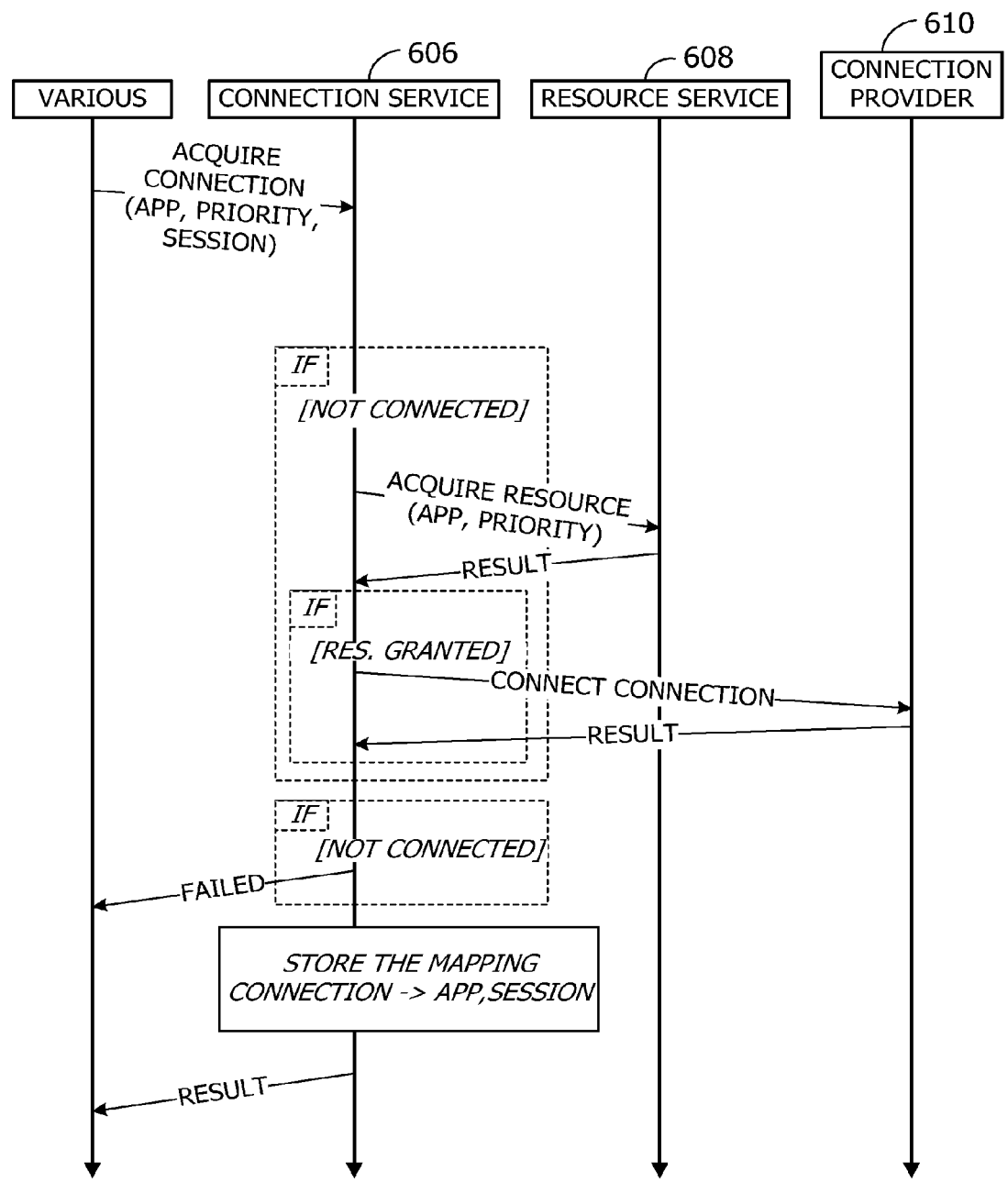
FIG. 10 is an exemplary sequence diagram illustrating calls to acquire access to a communication interface.
Figure 11:
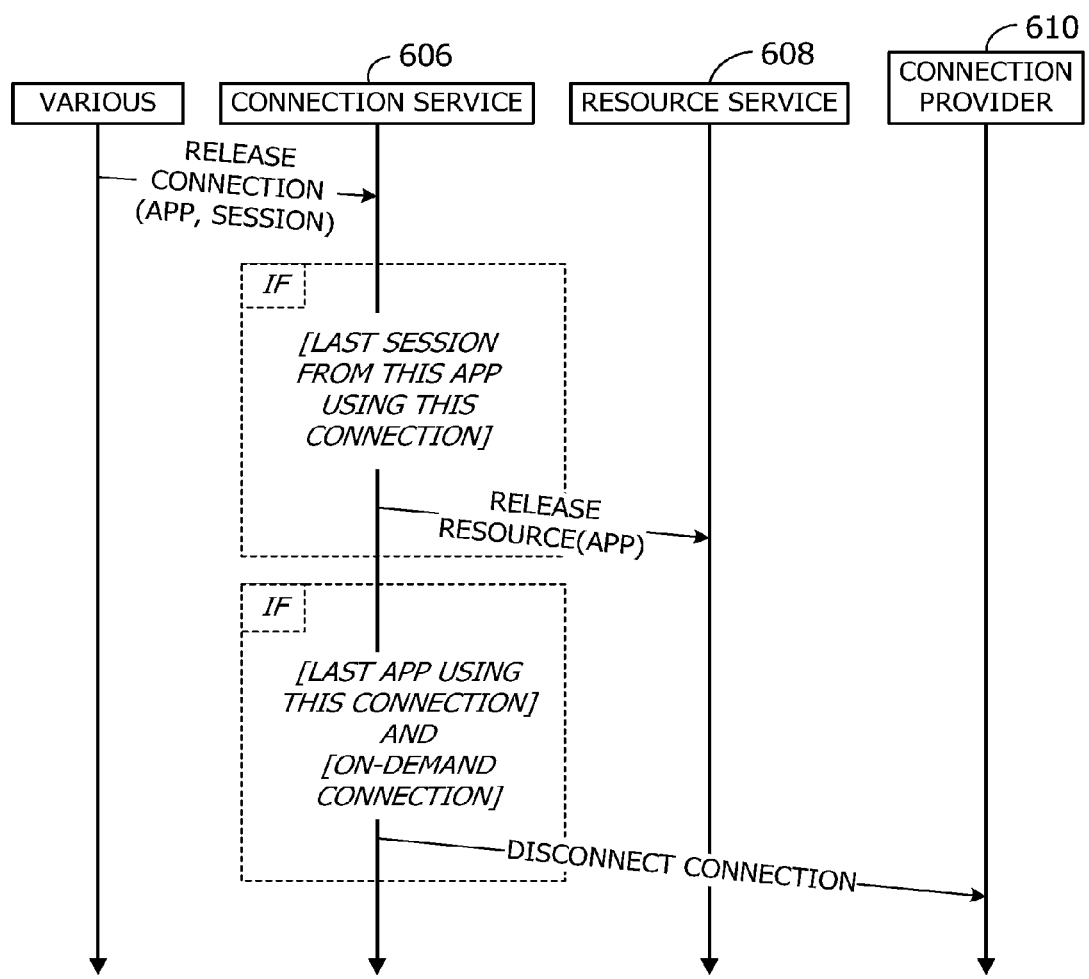
FIG. 11 is an exemplary sequence diagram illustrating calls to release a communication interface.

Referring next to FIG. 7, FIG. 8, FIG. 9, FIG. 10, and FIG. 11, various scenarios are illustrated with reference to some of the entities illustrated in FIG. 6. In FIG. 7, an exemplary sequence diagram illustrates one of the application programs 110 obtaining the list 108 of available communication interfaces 109 from the connection service 606 based on a policy. In FIG. 8, an exemplary sequence diagram illustrates one of the application programs 110 enumerating the list 108 of available communication interfaces 109. In FIG. 9, an exemplary sequence diagram illustrates one of the application programs 110 selecting one of the communication interfaces 109 over which to send a hypertext transfer protocol request. In FIG. 10, an exemplary sequence diagram illustrates calls to acquire access to one of the communication interfaces 109. In FIG. 11, an exemplary sequence diagram illustrates calls to release one of the communication interfaces 109.

Examples

Some embodiments of the disclosure select or order the communication interfaces 109 based on the connection that worked most recently for the requesting application program 110. Such a preference is valid in the context of a single application program 110 across all its connection service 606 sessions based on the premise that typical application programs 110 communicate with hosts available on the same network (e.g., the same connection) in bursts. For example, objects on a web page are likely to be accessible on the same connection on which the web page was found. In this example, the preference expires when a definable time has been reached, where the definable time is a delta between the last and new connection enumeration to select a connection. The preference may also expire when the last and new connection enumeration have a different set of candidate connections.

Alternatively or in addition, some embodiments of the disclosure prefer the last good connection to a specific host. For example, a connection that worked to connect the application program 110 to a specific host is preferred for subsequent attempts to connect to the same host. The cache is valid across all application programs 110.

For disconnected connections, some embodiments of the disclosure prefer the last successfully connected connection.

Embodiments of the disclosure include per interface negative name caching. Instead of negative caching per host, embodiments cache per interface on which the domain name service (DNS) query went. For example, if the DNS query times out on a particular interface, then that implies negative caching for all hosts on that particular interface. Other embodiments contemplate an adaptive per interface DNS timeout that uses results from previous name resolutions to the given DNS server to measure latency that is used to dynamically adjust the timeout for each try. Other embodiments contemplate an adaptive per interface DNS retry count in which the results dynamically adjust the number of retries before there is a negative caching result (e.g., a lack of response). Some embodiments contemplate interface profiling in which the latency, packet loss, and bandwidth are aggregated per interface based on the per interface TCP connection statistics. A similar embodiment contemplates per interface per subnet profiling. The result from this profiling can be used to order connections by application preference such that the first connection is the one likely to get the application networking performance that it needs.

Exemplary connection requirements are next described. In some embodiments, a requirement is expressed as a 3-tuple: a connection characteristic, a relational operator and a value for the characteristic. Some examples of connection requirements are bandwidth, Internet IP connectivity, and a latency less than 100 ms (e.g., for a connection with a latency lower than 100 ms). Connections that do not meet such requirements when selecting or enumerating the connections are removed from the list of candidate connections. Exemplary connection characteristics include bandwidth, latency, network stability, power efficiency, cost, link security, bandwidth, Internet IP connectivity, Internet HTTP connectivity, and quality of service support.

Exemplary preferences 112 include an ordered list of one or more connection preferences for a session. In some embodiments, a session represents a context in which the application program 110 performs connectivity operations (e.g., connecting a socket, sending a hypertext markup language request, enumerating candidate connections, etc.). Each of the preferences may be expressed as a 3-tuple: a connection characteristic, an operator and a boundary value for the characteristic. Some examples of connection preferences include the following: a lower latency (e.g., the application program 110 prefers connections with lower latency) and a latency of at most 100 ms (e.g., the application program 110) prefers connections with lower latency but any connection with latency lower than the 100 ms boundary value meets the application program 110 preferences. The connection service 606 then uses other criteria to select among the connections.

Sample pseudo-code for selection of connection is included in Appendix A.

Exemplary Operating Environment

While aspects of the invention are described with reference to the computing device 102 being a mobile computing device such as a mobile telephone, embodiments of the invention are operable with any computing device. For example, aspects of the invention are operable with devices such as laptop computers, gaming consoles (including hand-held gaming consoles), hand-held or vehicle-mounted navigation devices, portable music players, a personal digital assistant, an information appliance, a personal communicator, a handheld television, or any other type of electronic device.

Aspects of the invention transform a general-purpose computer into a special-purpose computing device when configured to execute the instructions described herein.

By way of example and not limitation, computer readable media comprise computer storage media and communication media. Computer storage media exclude communication media and store information such as computer readable instructions, data structures, program modules or other data. Communication media typically embody computer readable instructions, data structures, program modules, or other data in a modulated data signal such as a carrier wave or other transport mechanism and include any information delivery media. Combinations of any of the above are also included within the scope of computer readable media.

Although described in connection with an exemplary computing system environment, embodiments of the invention are operational with numerous other general purpose or special purpose computing system environments or configurations. Examples of well known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

The embodiments illustrated and described herein as well as embodiments not specifically described herein but within the scope of aspects of the invention constitute exemplary means for selecting the communication interfaces 109 for use by the application program 110 based on the preferences 112 of the application program 110, and exemplary means for ranking the communication interfaces 109 based on the preferences 112 and iteratively identifying the communication interfaces 109 to the application program 110 according to said ranking.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

APPENDIX A

Exemplary pseudo-code for explicit selection of connections is shown below.

```
// explicitly create session
hSession = CreateSession( )
// set connection requirements/preferences
SetConnectionPreferences(hSession, preferences)
SetConnectionRequirements(hSession, requirements)
// enumerate connections for a host
EnumConnectionsByName(hSession, host)
for_each(hConnection)
{
    // resolve host name on the connection
    GetHostAddresses(hConnection, host)
    for_each(addr)
    {
        socket s
        // bind socket source address
        bind(s, addr.src)
        // try to connect to destination address
        WSAConnect(s, addr.dest, ...)
    }
}
// ...
// explicitly close session
CloseSession(hSession)
```

Exemplary pseudo-code for connection through a proxy is shown below. The keywords listed in the pseudo-code may differ among implementations.

```
// explicitly create session
hSession = CreateSession( )
// set connection requirements/preferences
SetConnectionPreferences(hSession, preferences)
SetConnectionRequirements(hSession, requirements)
// enumerate connections for a host
// disable name resolution filtering
EnumConnectionsByName(hSession, host)
for_each(hConnection)
{
    // query for proxy associated with the connection
    proxy = QueryProxySettings(hConnection)
    if(proxy)
    {
        // resolve proxy name on the connection
        GetHostAddresses(hConnection, proxy)
        for_each(addr)
        {
            socket s
            // bind socket to source address
            bind(s, addr.src)
            // try connecting to the host via proxy
            WSAConnect(s, addr.dest, ...)
        }
    }
    // try resolving host name and connecting to it directly
}
// ...
// explicitly close session
CloseSession(hSession)
```

What is claimed is:

1. One or more computer memories storing computer-executable components, said components comprising:
    a candidate component for defining a list of communication interfaces available on a multi-homed computing device executing an application program;
    a service component for receiving, by the multi-homed computing device, a request to communicate with a destination computing device;
    a policy component for accessing one or more interface restrictions associated with the request received by the service component, the multi-homed computing device having different interface restrictions for different destination computing devices; and
    a filter component for removing at least one of the communication interfaces from the list based on the accessed one or more interface restrictions to construct a candidate list of communication interfaces for the application program which iteratively attempts to communicate with the destination computing device using the candidate list of communication interfaces.

2. The computer memories of claim 1, wherein the filter component removes at least one communication interface from the list based on a connection attempt status with the at least one communication interface.

3. The computer memories of claim 1, wherein the interface restrictions are based on connection types.

4. A system for managing communication interfaces on a multi-homed computing device, said system comprising:
    a memory area associated with a multi-homed computing device, said memory area storing policies for communication between the multi-homed computing device and destination computing devices via communication interfaces, at least two of the policies being different for different destination computing devices; and
    a processor associated with the multi-homed computing device, said processor programmed to:
        receive, by the multi-homed computing device, a request to communicate with one or more of the destination computing devices;
        access one or more of the policies associated with the received request;
        select one of a plurality of communication interfaces based on the accessed policies associated with the received request; and
        iteratively attempt to communicate with said one or more of the destination computing devices using said selected one of the plurality of communication interfaces.

5. The system of claim 4, wherein the destination computing devices represent a host, and wherein the processor is configured to map an application-host pair to one or more of the communication interfaces, the policies being applicable to all applications regardless of the hosts or the policies being applicable to all the hosts regardless of the applications.

6. The system of claim 4, wherein the policies are defined based on connection attempt statuses associated with the destination computing devices.

7. The system of claim 4, further comprising a networking stack associated with the computing device, wherein the networking stack iteratively attempts to communicate with said one or more of the destination computing devices using the one or more selected communication interfaces.

8. The system of claim 4, wherein the processor is further programmed to access a global connection preference policy specifying a preference order for selecting one or more of the communication interfaces.

9. The system of claim 8, further comprising one of the following global connection preference policies: best performance, best battery life, and a balance between battery life and performance.

10. A method comprising:
    evaluating a plurality of preferences to construct a candidate list of connections for an application executing on a computing device;
    ordering the candidate list of connections based on a first preference associated with the application executing on the computing device;
    identifying at least two equivalent connections in the candidate list of connections, the at least two connections being equivalent based on a value of a characteristic for each connection;
    ordering the at least two equivalent connections in the candidate list of connections based on a second preference;
    identifying the ordered list of connections to the application for communicating with one or more destination computing devices, wherein at least two of the plurality of preferences are different for different destination computing devices; and
    iteratively attempting to communicate with at least one of said different destination computing devices using the connections identified in the ordered list.

11. The method of claim 10, wherein the values of the characteristic are within a defined margin or beyond a boundary value.

12. The method of claim 10, wherein ordering the candidate list of connections is performed by a connection service executing on the multi-homed computing device.

13. The method of claim 12, wherein the connection service orders the list of candidate connections based on a state of each of the candidate connections.

14. The method of claim 12, wherein the connection service exchanges data with a resource service executing on the computing device, the resource service maintaining a policy for resource conflict resolutions.

15. The method of claim 10, further comprising selecting a previous successfully connected connection for the application.

16. The method of claim 10, wherein the preferences expire after a predefined time period or when a last connection enumeration and a new connection enumeration have a different set of candidate connections.

17. The method of claim 10, wherein the characteristic includes one of the following: bandwidth, latency, network stability, power efficiency, cost, link security, Internet IP connectivity, Internet HTTP connectivity, or quality of service support.

18. The method of claim 10, further comprising preferring a previous successfully connected connection for connecting the application to a destination computing device for subsequent attempts to connect to the same destination computing device.

19. The method of claim 18, wherein the previous successfully connected connection is preferred for connecting all applications to the same destination computing device.

20. The method of claim 10, wherein the application automatically uses one of the connections in the ordered list of connections based on at least one of the plurality of preferences.

* * * * *